United States Patent
Peebles et al.

(10) Patent No.: US 7,180,862 B2
(45) Date of Patent: Feb. 20, 2007

(54) APPARATUS AND METHOD FOR VIRTUAL OUTPUT QUEUE FEEDBACK

(75) Inventors: Brian E. Peebles, Cranford, NJ (US); Gerald Lebizay, Madison, NJ (US); Neal C. Oliver, Florham Park, NJ (US)

(73) Assignee: Intel Corporation, Sants Clara, CA (US)

( * ) Notice: Subject to any disclaimer, the term of this patent is extended or adjusted under 35 U.S.C. 154(b) by 229 days.

(21) Appl. No.: 10/199,543

(22) Filed: Jul. 18, 2002

(65) Prior Publication Data

US 2004/0013124 A1    Jan. 22, 2004

(51) Int. Cl.
*H04J 3/16* (2006.01)
*H04L 12/56* (2006.01)

(52) U.S. Cl. .................... 370/235; 370/416; 370/418

(58) Field of Classification Search ............... 370/389, 370/395.1, 395.21, 412–418, 230, 235
See application file for complete search history.

(56) References Cited

U.S. PATENT DOCUMENTS

| | | | |
|---|---|---|---|
| 5,402,416 A | 3/1995 | Cieslak et al. | |
| 5,557,608 A | 9/1996 | Calvignac et al. | |
| 5,781,801 A | 7/1998 | Flanagan et al. | |
| 5,923,656 A | 7/1999 | Duan et al. | |
| 5,956,341 A | 9/1999 | Galand et al. | |
| 5,978,359 A * | 11/1999 | Caldara et al. | 370/236 |
| 6,011,798 A | 1/2000 | McAlpine | |
| 6,141,323 A | 10/2000 | Rusu et al. | |
| 6,145,089 A | 11/2000 | Le et al. | |
| 6,154,446 A | 11/2000 | Kadambi et al. | |
| 6,182,111 B1 | 1/2001 | Inohara et al. | |
| 6,184,886 B1 | 2/2001 | Bates et al. | |
| 6,185,619 B1 | 2/2001 | Joffe et al. | |
| 6,205,477 B1 | 3/2001 | Johnson et al. | |
| 6,282,569 B1 | 8/2001 | Wallis et al. | |
| 6,360,262 B1 | 3/2002 | Guenthner et al. | |
| 6,404,752 B1 | 6/2002 | Allen, Jr. et al. | |
| 6,473,815 B1 * | 10/2002 | Lu et al. ...................... | 710/52 |
| 2001/0043606 A1 | 11/2001 | Han et al. | |
| 2004/0004961 A1 * | 1/2004 | Lakshmanamurthy et al. ... | 370/364 |

FOREIGN PATENT DOCUMENTS

WO    WO 99/54830    10/1999

OTHER PUBLICATIONS

"Method and Apparatus for Controlling Traffic Congestion in a SWitch Fabric Network", U.S. Appl. No. 09/609,172, filed Jun. 30, 2000, Inventor: Gary McAlpine, 39 Pgs.

(Continued)

*Primary Examiner*—Doris H. To
*Assistant Examiner*—Soon D. Hyun (57) ABSTRACT

A method of providing virtual output queue feedback to a number of boards coupled with a switch. A number of virtual queues in the switch and/or in the boards are monitored and, in response to one of these queues reaching a threshold occupancy, a feedback signal is provided to one of the boards, the signal directing that board to alter its rate of transmission to another one of the boards. Each board includes a number of virtual output queues, which may be allocated per port and which may be further allocated on a quality of service level basis.

39 Claims, 7 Drawing Sheets

OTHER PUBLICATIONS

"Method and Apparatus for a Traffic Optimizing Multi-Stage Switch Fabric Network", U.S. Appl. No. 09/819,675, filed Mar. 29, 2001, Inventor: Gary McAlpine, 62 Pgs.

Infiniband Architecture Specification vol. 1, Release 1.0.a, Jun. 19, 2001, Copyright 1999, 2001, by InfiniBand Trade Association, 913 Pgs.

Infiniband Architecture Specification vol. 2, Release 1.0.a, Jun. 19, 2001, Copyright 1999, 2001, by InfiniBand Trade Association, 631 Pgs.

PCI Express Base Specification Revision 1.0, Jul. 22, 2002, Copyright 2002, PCI-SIG, 422 Pgs.

Oliver Feuser, et al., "On the Effects of the IEEE 802.3x Flow Control in Full-Duplex Ethernet LANs", Universary of Bonn, Institute of Computer Science IV, 1999 IEEE, pp. 160-161.

Jing-Fei Ren, et al., "Flow Control and Congestion Avoidance in Switched Ethernet LANs", Core Network Technology, DSP R&D Center, 1997 IEEE, pp. 508-512.

PCT Written Opinion, PCT Application No. PCT/US03/22774, mailed May 12, 2004, 6 pages.

PCT International Preliminary Examination Report, PCT Application No. PCT/US03/22774, mailed May 19, 2005, 7 pages.

* cited by examiner

APPARATUS AND METHOD FOR VIRTUAL OUTPUT QUEUE FEEDBACK

FIELD

Embodiments of the invention relate generally to packet switching and, more particularly, to a method of providing output queue feedback to a transmission source.

BACKGROUND

Traffic management over a high-speed backplane fabric is necessary to insure efficient utilization of available bandwidth. Typically, a backplane fabric interconnects a number of "boards" within a chassis, and a switch coupled with the backplane fabric performs packet switching amongst the boards. The backplane fabric includes a plurality of links that couple each board with the switch, and a failure to efficiently manage the bandwidth over these links may result in packet loss and/or a high latency for communications between boards.

One problem plaguing high-speed backplane fabrics is known as "head-of-line blocking." As noted above, a switch coupled with the backplane fabric performs packet switching between boards. This switch will include a number of input ports and a number of output ports (usually an equal number), and each board coupled with the backplane is connected with one of these input ports and one of the output ports. Generally, packets (or frames, cells, etc.) arriving at an input port of the switch are, prior to being routed to the appropriate output port, stored in a FIFO (first-in, first-out) buffer or other memory, this memory usually referred to as an "input buffer." Once a packet has been routed to the appropriate output port, it may again be stored in a FIFO type memory prior to transmission on the output port, this memory usually referred to as an "output buffer." Often times, the first packet in the output buffer is blocked because that buffer's corresponding output port is busy or congested. When this first packet does not have access to the resource (i.e. output port) that it needs, other packets stored in the output buffer are also blocked. Further, any of the input buffers at the input ports that contain a packet destined for the busy port are also blocked, as the first packet in an input buffer can not be transmitted to the full output buffer. In other words, communications from a number of sources may be blocked due to a "traffic jam" at one port, this condition being referred to as head-of-line blocking.

One way of compensating for head-of-line blocking is to employ a speed-up factor on the fabric links that couple the switch with the boards. If multiple sources are attempting to transmit data to the same destination board, the output port on the switch that is coupled with the destination board will experience heavy traffic. For example, at some instant in time, three boards—e.g., boards A, B, and C—are transmitting data to the same board—e.g., board D—and the switch's output port corresponding to board D may experience traffic that, at that instant in time, is three times the normal I/O bandwidth capacity of the boards. If the bandwidth of the link coupling board D to its corresponding output port on the switch merely equals the board I/O bandwidth capacity, then it may take three times as long for the data to travel from the output buffer (of the switch output port corresponding to board D) to board D. To overcome this latency, a speed-up factor is employed on the fabric links that are coupled with the output ports of the switch. Specifically, additional links may be provided between a board (e.g., board D) and its corresponding output port on the switch, such that the bandwidth of the links is sufficient to handle the increased traffic that may occur when multiple boards (e.g., boards A, B, and C) attempt to communicate with the same destination (e.g., board D).

Ideally, the speed up factor is equal to the number of boards connected to the backplane fabric minus one (i.e., $N-1$, where N is the number of boards), such that one board may receive traffic from all other boards simultaneously. Accordingly, the link rate equals the board bandwidth capacity multiplied by the speed-up factor, or $(N-1)$. However, such a speed-up factor (i.e., $N-1$) is impractical where there is even a modest number of boards and, typically, a speed-up factor in the range of 1.5 to 2.5 has proved suitable for most applications. Thus, the speed-up factor helps to minimize head-of-line blocking by more quickly moving data out of the output buffer of each output port on the switch. However, there are limits on the extent to which employing a speed-up factor can control the problem of head-of-line blocking. For example, there are practical limitations on the magnitude of the speed-up factor, as noted above, and, further, increasing the link bandwidth capacity generally increases costs.

The above-described solution—i.e., a speed-up factor—for solving the problems of congestion and head-of-line blocking is not available for all technologies. In particular, the primary standardized switching technologies—e.g., InfiniBand, PCI Express, RapidIO, and Fast Ethernet—are not capable of supporting such a speed-up factor. See, e.g., *InfiniBand Architecture Specification*, Volumes 1 & 2, Release 1.0.a, June 2001; *Peripheral Component Interconnect (PCI) Express Specification*, Rev. 1.0 (formerly known as *Third Generation I/O*, or 3*GIO*); *RapidIO Interconnect Specification*, Rev. 1.1, March 2001; and the Institute of Electrical and Electronics Engineers (IEEE) 802.3 family of specifications (Ethernet).

DETAILED DESCRIPTION

Figure 1:
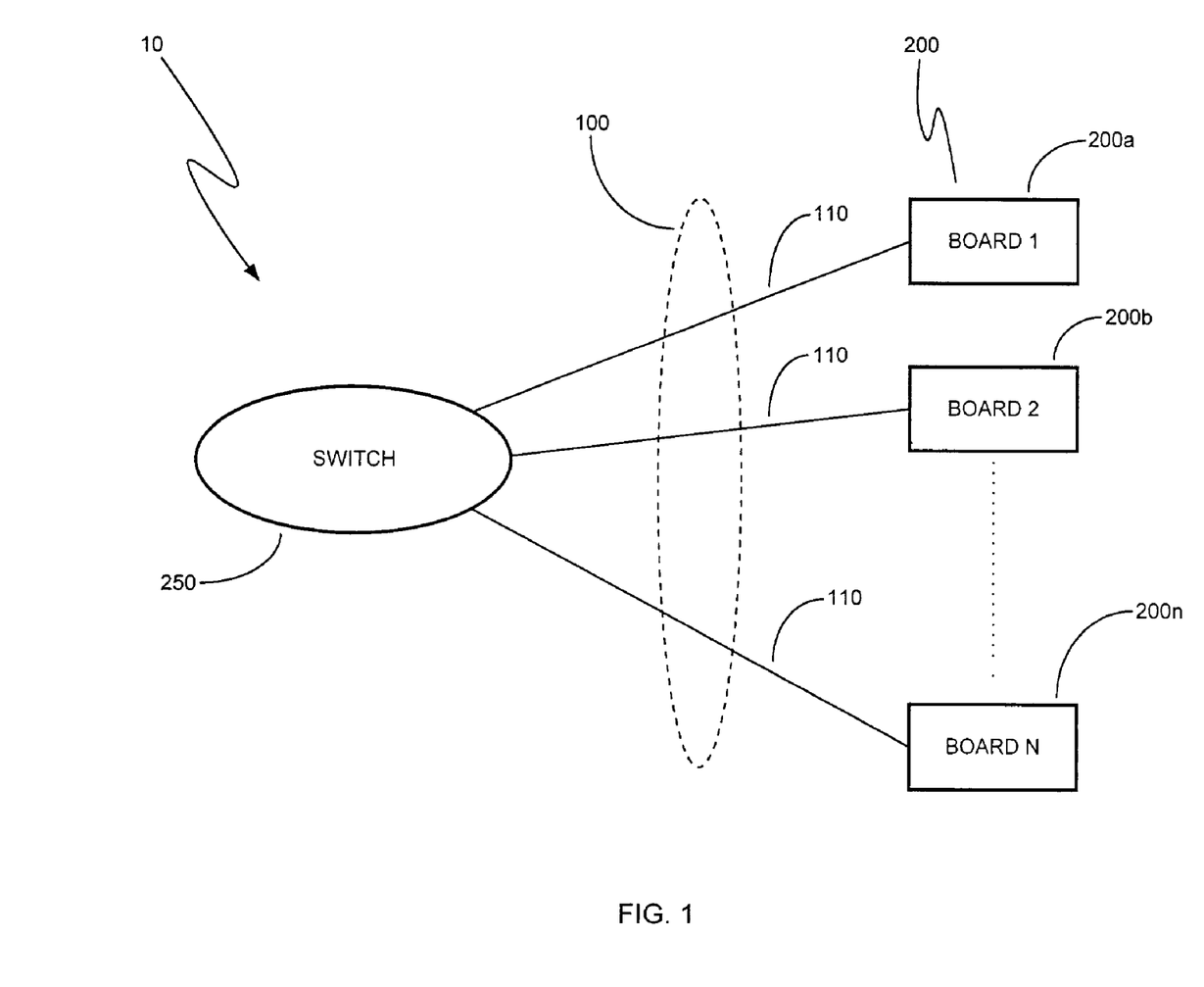
FIG. 1 is a schematic diagram illustrating an embodiment of a system including a backplane fabric coupled with a switch and a number of boards.

Referring to FIG. 1, a system 10 includes a backplane fabric 100 having a plurality of links 110. A number of boards 200 are coupled with the backplane fabric 100. For example, boards 200a (BOARD 1), 200b (BOARD 2), ..., 200n (BOARD N) may be coupled with the fabric 100. A switch 250 is also coupled with the fabric 100, wherein one or more links 110 of fabric 100 couple each of the boards 200a–n with the switch 250. Thus, the backplane fabric 100 facilitates communication amongst the boards 200 and between the switch 250 and boards 200. The system 10 may conform to any suitable standard, such as InfiniBand, PCI Express, RapidIO, or Fast Ethernet, as well as others.

It should be understood that, although one link 110 is shown coupling each board 200 to the switch 250, each of the boards 200a–n may, in practice, be coupled to both an input port of the switch and an output port of the switch (e.g., communications between the switch 250 and each board 200 may be full duplex), as will be described below. Further, more than one link may couple a board 200 to an input port of the switch 250, and more than one link may couple the board 200 to an output port of the switch 250. Thus, multiple links 110 may couple a board 200 to an input port of the switch 250, and another set of multiple links 110 may couple that board 200 to an output port of the switch 250.

The backplane fabric 100 may comprise any suitable entity—e.g., communication paths plus control and/or management functions—over which communications may take place amongst the boards 200a–n and switch 250. Thus, a link 110 may provide an electrically conductive path (e.g., a conductive trace), an optical path (e.g., a fiber optic cable), or a combination thereof, as well as any other suitable communication path. Also, the backplane fabric 100 may, in addition to providing communication paths, include logic circuitry to perform control functions. Further, though not illustrated in FIG. 1, the system 10 may, in addition to the backplane fabric 100, include power and ground planes, respectively, to provide power and ground to the boards 200a–n and switch 250.

In one embodiment, the system 10 comprises the chassis of a server or other computer system, wherein each of the boards 200a–n is a component (e.g. a network card, a processor, an I/O card, etc.) of the server that is "plugged in" to the backplane fabric 100 of the chassis. Generally, the switch 250 would also comprise a separate component that is coupled with the backplane fabric 100. Although the word "board" is often times used to reference a collection of discrete devices (e.g., integrated circuit chips) assembled together on a board (e.g., a printed circuit board), this term is not so narrow in scope as applied to the disclosed embodiments. Rather, as used herein, the term "board" refers to any device or component that may be coupled with the backplane fabric 100, irrespective of whether the backplane fabric 100 comprises part of the chassis of a computer system or is disposed in alternative systems or used in alternative environments and, further, irrespective of the particular standards or specifications (e.g., InfiniBand, RapidIO, PCI Express, Ethernet) employed.

Figure 2:
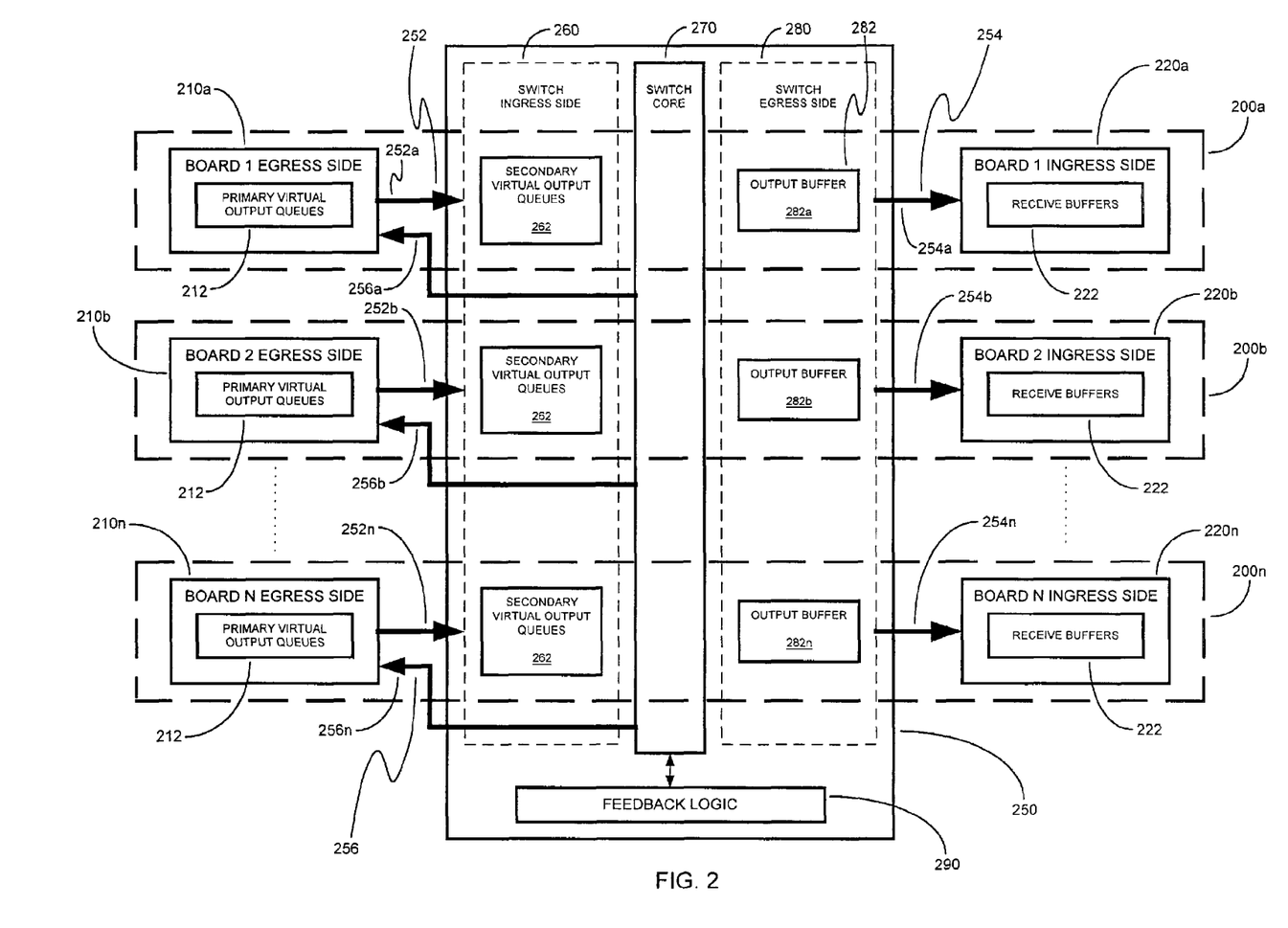
FIG. 2 is a schematic diagram illustrating an embodiment of the switch and boards shown in FIG. 1.

Referring now to FIG. 2, an embodiment of the switch 250 and boards 200a–n is illustrated in greater detail. The switch 250 includes a number of input ports 252, including input ports 252a, 252b, . . . , 252n, wherein each of these input ports 252a–n is coupled with one of the boards 200a–n. The switch 250 also includes a number of output ports 254, including output ports 254a, 254b, . . . , 254n, wherein each of these output ports 254a–n is coupled with one of the boards 200a–n. As noted above, one or more links 110 (not shown in FIGS. 2 and 3) couple each of the boards 200a–n to its corresponding input port 252a–n, and one or more links 110 couple each of the boards 200a–n to its corresponding output port 254a–n.

Generally, in a centrally switched system, the number of input ports 252 is equal to the number of boards 200 coupled with the backplane fabric 100, and the number of input ports 252 and the number of output ports 254 are also equivalent. However, it should be understood that the number of input and output ports 252, 254 may not be equivalent. Also, it should be understood that the disclosed embodiments of the switch 250 scale to any suitable number of input ports 252 and output ports 254 (as well as to any suitable number of boards 200). It should be further understood that the disclosed embodiments may find application in architectures other than centrally switched systems (e.g., in meshed systems where each board or component includes a switch).

The switch 250 includes an ingress side 260, a switch core 270, and an egress side 280, as well as feedback logic 290. The ingress side 260 receives communications from the boards 200a–n via input ports 252a–n, respectively. Included in the ingress side 260 are a number of secondary virtual output queues 262, wherein a number of the secondary virtual output queues 262 is associated with each of the input ports 252a–n. The secondary virtual output queues 262 may be implemented in any suitable type of memory, such as, for example, a random access memory (RAM). As will be explained in greater detail below, the secondary virtual output queues 262 provide storage for packets prior to packet switching and routing through switch core 270. It should be understood that the switch 250 may include a memory (not shown in figures) for storing received packets, and the secondary virtual output queues 262 may store the addresses of packets that are stored in such memory (wherein a packet, once stored in this memory, does not "move" until output from the switch 250). Thus, the secondary virtual output queues 262 may store packet addresses rather than the actual packet data.

The egress side 280 of switch 250 outputs communications to the boards 200 via the appropriate output port 254, respectively. Egress side 280 includes a number of output buffers 282, including output buffers 282a, 282b, . . . , 282n, wherein each of the output buffers 282a–n is associated with one of the output ports 254a–n. For example, output buffer 282a is associated with output port 254a. As will be described below, the output buffers 282 provide storage for packets (or packet address, as noted above) prior to routing and transmission of a packet out of the switch 250 and to that packet's destination (i.e., one of boards 200a–n).

The switch core 270 couples the input ports 252a–n and ingress side 260 with the output ports 254a–n and egress side 280. The switch core 270 couples each of the input ports 252 with each and every output port 254. Thus, a communication received on any one of the input ports 252a–n may be routed to any of the output ports 254a–n and, hence, to any of the boards 200a–n (although a communication is generally not routed to the board 200 from which it originated).

As noted above, the switch 250 also includes feedback logic 290. The feedback logic 290 includes the necessary control and/or logic circuitry (and/or software) to perform output queue feedback. More specifically, as will be set forth below in greater detail, the feedback logic 290 may perform threshold monitoring and/or "queue occupancy estimation" (QOE). Although illustrated as a separate element, it should be understood that feedback logic 290 may form a part of, or share circuitry with, other elements (e.g., switch core 270) of the switch 250. Also, it should be understood that, in practice, the switch 250 will include other logic circuitry (e.g., for performing routing, control and management functions, etc.) in addition to the feedback logic 290.

Each of the boards 200 includes an egress side and an ingress side. For example, the board 200a includes an egress side 210a and an ingress side 220a, the board 200b includes an egress side 210b and an ingress side 220b, and so on. The egress side 210a–n of each board 200a–n is coupled to an input port 252 (at ingress side 260) of the switch 250, whereas the ingress side 220a–n of each board 200a–n is coupled an output port 254 (at egress side 280) of switch 250. For example, the egress side 210a of board 200a is coupled with the input port 252a of switch 250, and the ingress side 220a of board 200a is coupled with the output port 254a of switch 250. The other boards 200b–n are similarly arranged. The egress side of each board 200 comprises hardware and/or software whose function is to output packets to the ingress side 260 of the switch 250, whereas the ingress side of each board 200 comprises hardware and/or software whose function is to receive packets from the egress side 280 of switch 250. Notice that, according to this terminology, the egress side of a board 200 transmits to the ingress side of the switch 250, and the egress side of the switch 250 transmits to the ingress side of the board. Further note that, in FIG. 2, each of the boards 200a–n is illustrated in an "unfolded" view, wherein the egress side 210a–n is shown on the left-hand side of FIG. 2 and the ingress side 220a–n shown on the right-hand side.

The egress side 210a–n of each board 200a–n includes a number of primary virtual output queues 212. The primary virtual output queues 212 may be implemented in any suitable type of memory, including, for example, a RAM. As will be explained below in more detail, the primary virtual output queues 212 of a board 200 provide storage for packets prior to transmission to the switch 250. It should be understood that a board 200 may include a memory (not shown in figures) for storing packets, wherein the primary virtual output queues 212 store the addresses of packets that are stored in such memory rather than the actual packet data.

The ingress side 220a–n of each board 200a–n includes a number of receive buffers 222. Receive buffers 222 provide storage for packets (or, alternatively, packet addresses) for packets received from switch 250. Operation of the receive buffer 222 is discussed below in more detail.

A feedback channel 256 couples the egress side 210a–n of each board 200a–n to the switch 250. For example, a feedback channel 256a couples the egress side 210a of board 200a to switch 250, a feedback channel 256b couples the egress side 210b of board 200b to switch 250, and so on. The feedback logic 290 may provide messages or signals to the boards 200 (directing the boards to "slow" their rate of data transmission) via the feedback channels 256a–n, respectively. Operation of the feedback channels 256a–n will be explained in more detail below.

Figure 3:
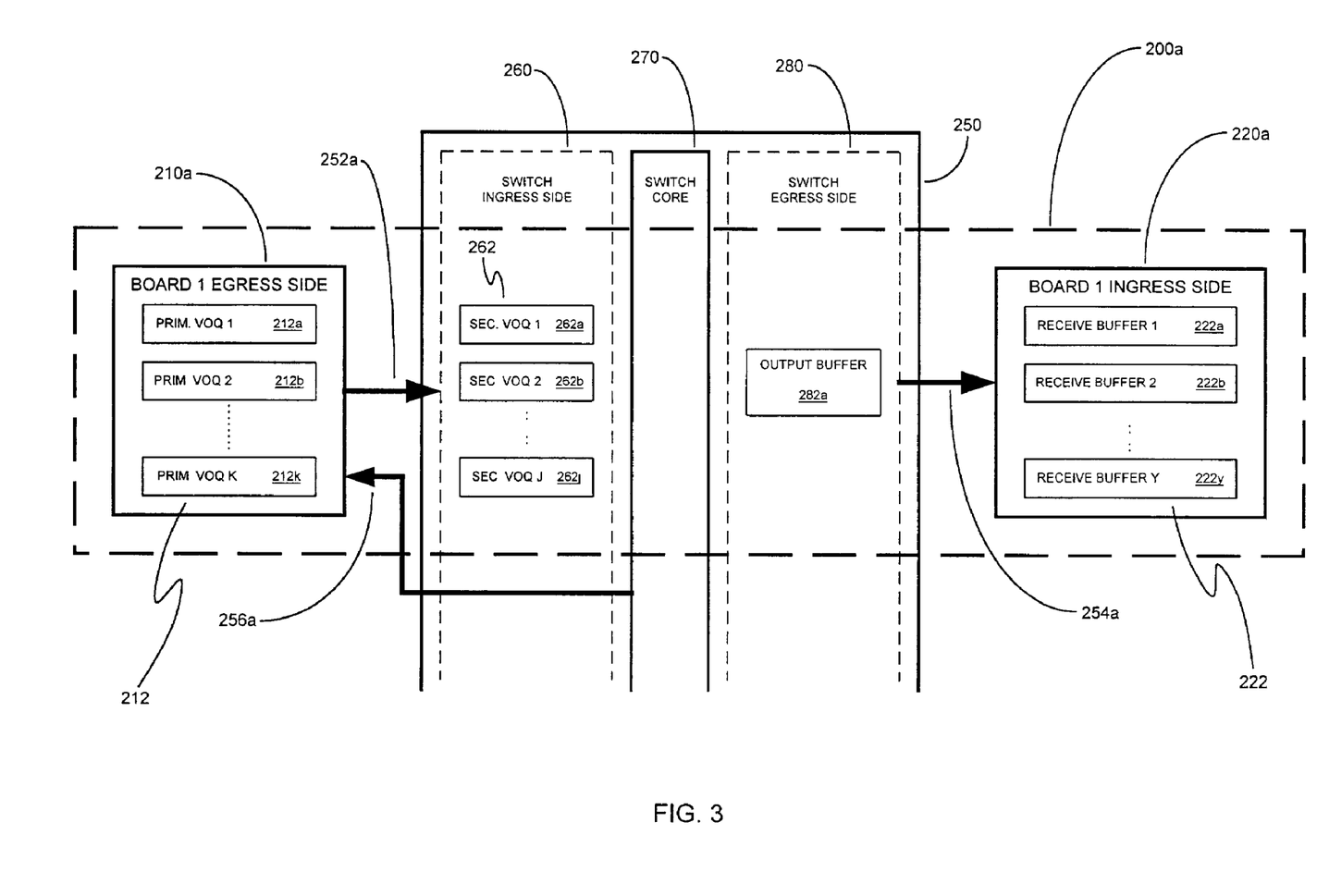
FIG. 3 is a schematic diagram illustrating an embodiment of the switch and boards shown in FIG. 2.

Shown in FIG. 3 is an expanded view of one of the boards (i.e., board 200a) and the switch 250 of FIG. 2. With reference to FIG. 3 in conjunction with FIG. 2, the egress side 210a of board 200a includes a number of primary virtual output queues (VOQ) 212, including primary virtual output queues 212a, 212b, . . . , 212k. In one embodiment, the number of primary virtual output queues 212a–k is one less than the number (N) of boards 200a–n in system 10 or, stated alternatively, one less than the number of output ports 254a–n (i.e., K=N−1). In another embodiment, which is described below with reference to FIG. 4, the primary virtual output queues 212a–k are further allocated on a quality of service level basis, and the number of primary virtual output queues 212a–k may exceed the number of boards 200a–n.

The egress side 210a of board 200a is coupled via input port 252a (and one or more links 110, which are not shown in FIGS. 2 and 3) to the ingress side 260 of switch 250. The ingress side 260 of switch 250 includes a number of secondary virtual output queues (VOQ) 262 associated with the egress side 210a of board 200a (and with input port 252a), including secondary virtual output queues 262a, 262b, . . . , 262j. Generally, the number (J) of secondary virtual output queues 262a–j (associated with any given input port 252) is equal to one less than the number of boards 200a–n or, stated alternatively, one less than the number of output ports 254a–n (i.e., J=N−1). However, it should be understood that the number of secondary virtual output queues 262a–j associated with any given input port 252 may exceed the number of output ports 254a–n (i.e., the secondary virtual output queues 262a–j may also be allocated on a quality of service level basis).

The ingress side 220a of board 200a includes a number of receive buffers 222, including receive buffers 222a, 222b, . . . , 222y. Generally, the number (Y) of receive buffers 222a–y is one less than the number of boards 200a–n or, stated alternatively, one less than the number of output ports 254a–n (i.e., Y=N−1). The ingress side 220a of board 200a is coupled via output port 254a (and one or more links 110) to the egress side 280 of switch 250. The egress side 280 of switch 250 includes an output buffer 282a associated with ingress side 220a of board 200a.

Figure 4:
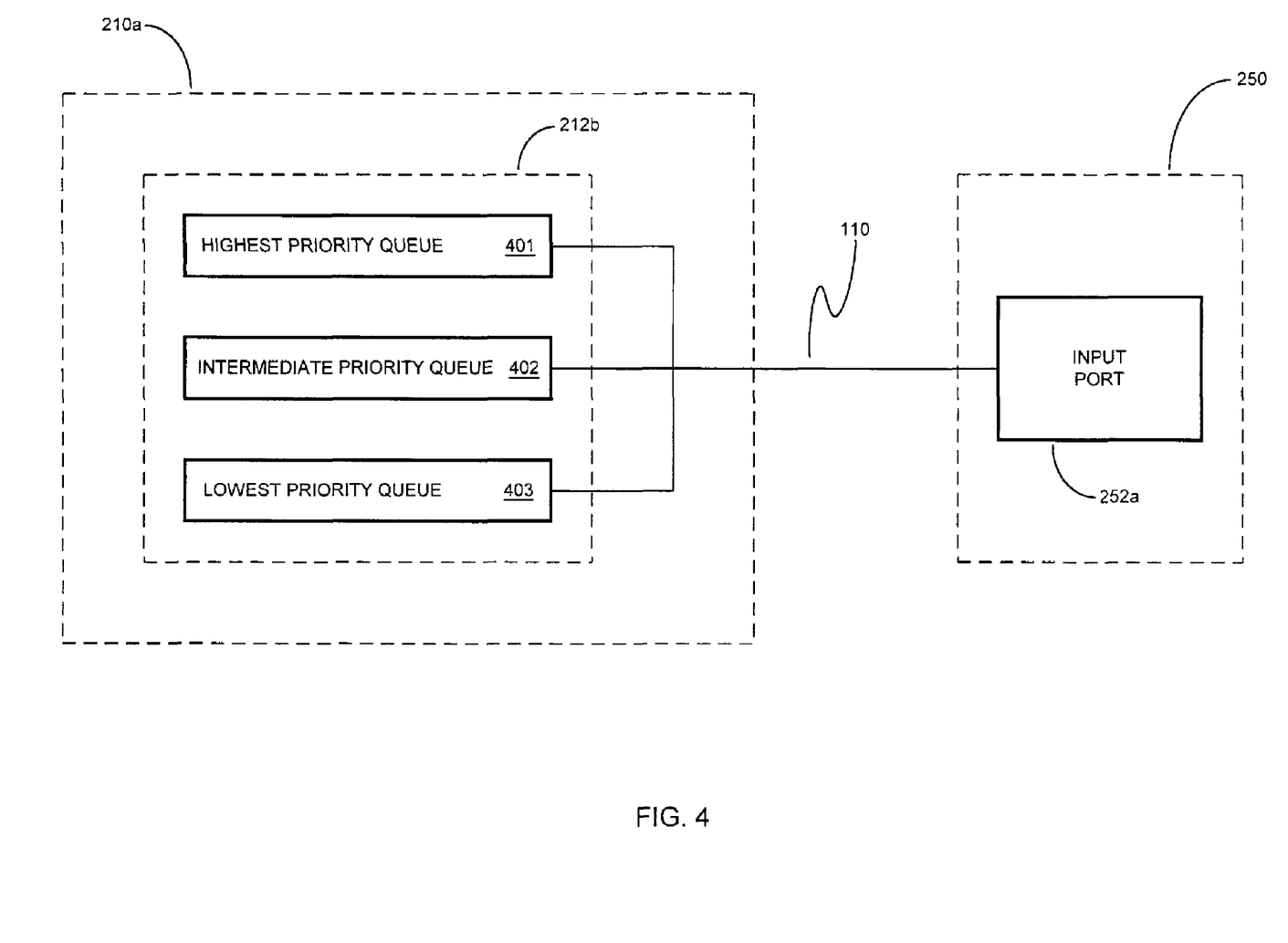
FIG. 4 is a schematic diagram illustrating another embodiment of the boards shown in FIG. 2.

Illustrated in FIG. 4 is an alternative embodiment, wherein the primary virtual output queues 212 are further allocated on a per quality of service level basis, as was suggested above. The egress side 210a of board 200a includes a number of primary virtual output queues 212a–k, as noted above. However, in addition to being allocated on a per port basis (as illustrated above in FIG. 3), the primary virtual output queues are also allocated on a per quality of service level basis. In this embodiment, a primary virtual output queues 212 shown in FIG. 3 could be viewed as a set of virtual output queues. For instance, as shown in FIG. 4, the primary virtual output queue 212b of board 200a comprises three separate virtual output queues 401, 402, 403, each of these virtual queues associated with a distinct quality of service level, but each virtual output queue 401, 402, 403 also being associated with the same output port (e.g., output port 254c) of switch 250. Thus, where there are a number M of service levels, the number (K) of primary virtual output queues 212 on each board 200 may equal the number of service levels (M) multiplied by one less than the number (N) of output ports 254—i.e., K=M(N−1).

By way of example, the virtual output queue 401 may correspond to the highest priority traffic (e.g., communications that are "guaranteed delivery" or "real time"), the virtual output queue 402 may correspond to intermediate priority traffic (e.g., communications that are "assured" delivery, but not time critical), and the virtual output queue 403 may correspond to the lowest priority traffic (e.g., communications that are to be delivered with "best effort" but not guaranteed). Any suitable number of quality of service levels, or priority levels, may be employed, with each quality of service level having a dedicated primary virtual output queue at the egress side 210a of board 200a. Also, as noted above, it should be understood that the allocation of queues on a quality of service level basis may—in addition to, or in lieu of, a quality of service level distribution of the primary virtual output queues—be applied to the secondary virtual output queues 262 at the ingress side 260 of switch 250.

During operation of the system 10, the boards 200a–n send data (e.g., packets, frames, cells, etc.) to one another via the backplane fabric 100, wherein the switch 250 routes data packets to the appropriate destination (e.g., a board 200 coupled with the backplane fabric 100). Packets that are to be transmitted from a board 200 (or the addresses of these packets) are stored in that board's primary virtual output queues 212 pending transmission. Each of the primary virtual output queues 212 of a board 200 is associated with one of the output ports 254a–n of switch 250, and each of the primary virtual output queues 212 may be further associated with a quality of service level, as noted above.

The secondary virtual output queues 262 at ingress side 260 of switch 250 receive packets from the board 200 associated with their respective input port 252, each secondary virtual output queue 262 being associated with an output port 254 of switch 250 (and, in another embodiment, each secondary virtual output queue 262 also being associated with a quality of service level, as described above).

The switch core 270 routes packets from the secondary virtual output queues 262 at ingress side 260 to the appropriate output buffer 282 at the egress side 280 of switch 250. From the output buffers 282 of switch 250, packets are transmitted to the ingress side of the appropriate board 200. Packets are received and stored in the receive buffers 222 of a board 200, wherein each of the receive buffers 222 of the board 200 is also associated with one of the output ports 254.

Operation of the system 10 may be better understood through illustration of a specific example. With reference to FIGS. 1 through 3, assume board 200a is transmitting a number of packets to a number of other boards 200. Board 200a stores these packets in its primary virtual output queues 212a–k. For example, those packets addressed to the board 200b on output port 254b may be stored in primary virtual output queue 212a, those packets addressed to the board 200c on output port 254c may be stored in primary virtual output queue 212b, and so on. Also, for each destination (i.e., for each board 200b–n), there may be a separate primary virtual output queue 212 for each quality of service level (see FIG. 4).

The packets stored in the primary virtual output queues 212a–k of board 200a are transmitted over one or more links 110 to the input port 252a of switch 250, where the packets are received in the secondary virtual output queues 262a–j associated with the input port 252a. If multiple links 110 couple the board 200a to its corresponding input port 252a on switch 250, packet data may be transmitted in parallel to the input port 252a on each clock cycle. If some or all of the primary virtual output queues 212a–k are allocated on a quality of service level basis, those packets having the highest priority may be transmitted first (i.e., packets may be transmitted out of order, as will be described below).

When a packet is received (from board 200a) at the ingress side 260 of switch 250, the packet is stored in one of the secondary virtual output queues 262a–j. More specifically, the packet is placed in that secondary virtual output queue 262 that corresponds to the output port 254 (and board 200) to which the packet is addressed. For example, a packet addressed to board 200b may be stored in the secondary virtual output queue 262a, a packet addressed to the board 200c may be stored in the secondary virtual output queue 262b, and so on.

Packets stored in the secondary virtual output queues 262a–j are routed by switch core 270 to the appropriate output buffer 282 and output port 252. By way of example, a packet (or address) stored in secondary virtual output queue 262a may be routed to output buffer 282b at output port 254b, a packet (or address) stored in secondary virtual output queue 262b may be routed to output buffer 282c at output port 254c, and so on. Again, the switch core 250 is capable of routing a packet received from any one of the input ports 252a–n to any of the output ports 254a–n.

The packet (or packets) are then transmitted from the output buffers 282b–n to the corresponding boards 200b–n. The packets are received in the receive buffers 222a–y at the ingress side of each board 200. For example, the packets sent from board 200a and received at each of the boards 200b–n may be stored in the receive buffer 222a of each board 200b–n.

For conventional systems—again, conventional switches typically included FIFO type memory structures at the input and output buffers—if an output port was busy or congested, thereby causing the output buffer associated with that output port to become "full," the switch core could no longer route packets to that output port and associated output buffer. In other words, that output port was "blocked" and the input buffers in the switch associated with the blocked output port could not transmit data to the board coupled with the blocked output port, a condition known as head-of-line blocking, as described above. All boards were then prohibited from transmitting packets to the clogged output port until the blocked condition could be cleared, thereby increasing switching latency.

The disclosed embodiments, however, provide a novel feedback channel 256 in conjunction with a novel memory structure—i.e., a set of primary virtual output queues 212 at the egress side of each board 200 in combination with a set of secondary virtual output queues 262 at the ingress side 260 of the switch 250—as well as a unique method of providing congestion control, that eliminate or minimize head-of-line blocking effects. Congestion control is provided by performing threshold monitoring or "queue occupancy estimation" (QOE) at the secondary virtual output queues 262 and, if necessary, providing a message to the source board 200 associated with that secondary virtual output queue 262 directing that board 200 to alter its rate of data transmission. Thus, this congestion control scheme—referred to herein as "virtual output queue feedback"—prevents the output buffers 282 from reaching an overloaded or full condition by preventing all secondary virtual output queues 262 that feed a particular output port 254 from becoming overloaded (e.g., they may never exceed a threshold level).

To perform threshold monitoring, the "queue occupancy" of each secondary virtual output queue 262 is compared against a predefined threshold value. "Queue occupancy" may refer to the number of bytes in a queue, the number of packets stored in a queue, or the number of packet addresses stored in a queue. If the queue occupancy exceeds the threshold value, a specific action will be triggered to prevent or minimize congestion. For example, the feedback logic 290 may monitor each of the secondary virtual output queues 262, and if the queue occupancy of a secondary virtual output queue 262 exceeds the threshold, the feedback logic 290 may provide a message (via one of the feedback channels 256) to the source board 200 associated with that secondary virtual output queue 262 directing that board 200 to alter its rate of data transmission. In response to the message, the board 200 may slow its rate of transmission or interrupt transmission for a period of time.

To perform QOE, the queue occupancy of a secondary virtual output queue 262 is periodically (generally, at very short intervals) measured, and a probability distribution—referred to herein as the "queue occupancy distribution" (QOD)—is estimated for the secondary virtual output queue 262. The QOD may be represented in many different ways. By way of example, the QOD may be a vector representing queue occupancy in terms of "deciles" (i.e., a percent of time that a queue is 10% full, a percent of time that the queue is 20% full, a percent of time that the queue is 30% full, and so on). The QOD may then be used to estimate the probability that a secondary virtual output queue 262 will exceed the predefined threshold. For example, the feedback logic 290 may monitor each of the secondary virtual output queues 262, and if the QOD of a secondary virtual output queue 262 suggests a high probability that the secondary virtual output queue 262 will exceed the threshold, the feedback logic 290 may provide a message (via one of the feedback channels 256) to the source board 200 associated with that secondary virtual output queue 262. Again, the message may direct that board 200 to alter its rate of data transmission and, in response to the message, the board 200 may slow its rate of transmission or interrupt transmission for a period of time.

In another embodiment, where QOE is employed, the predefined threshold may be set in terms of a threshold percentage of time that the queue occupancy of a secondary virtual output queue 262 is at or above a specified occupancy. If the QOD of a secondary virtual output queue 262 indicates that the specified occupancy has been reached for the threshold percentage of time, the feedback logic 290 may provide a message to the source board 200 associated with that secondary virtual output queue to ease congestion, as described above.

The threshold occupancy may be set at the same value for all secondary virtual output queues 262 and, similarly, a threshold percentage (for QOE) may be set at the same value for all secondary virtual output queues 262. Alternatively, the threshold occupancy may be set individually for each secondary virtual output queue 262, or set for a selected group of the secondary virtual output queues. The threshold percentage (for QOE) may be set on an individual (or group) basis as well. Selection of the threshold occupancy (or threshold percentage) is based, at least in part, upon the following criteria: if a secondary virtual output queue 262 reaches the threshold level, it is more likely that head-of-line blocking will occur at the output buffer 282 (and output port 254) associated with this secondary virtual output queue 262 and, therefore, the number of packets being fed to this secondary virtual output queue 262 needs to be decreased. The feedback logic 290 may store the predefined threshold occupancy (or threshold percentage) and may include the necessary logic and/or circuitry to monitor the status of the secondary virtual output queues 262.

Figure 5:
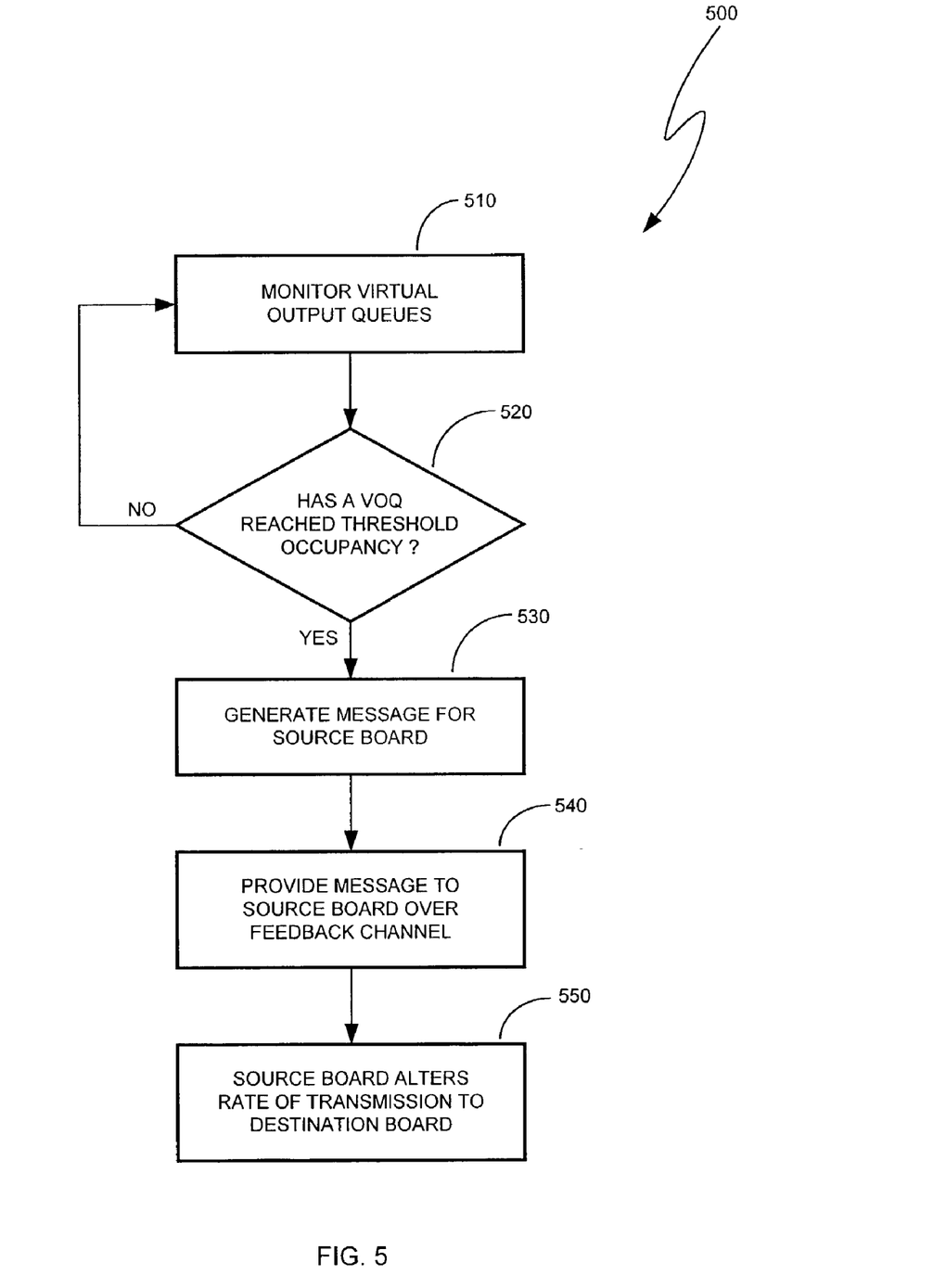
FIG. 5 is a block diagram illustrating an embodiment of a method of providing virtual output queue feedback.
Figure 6:
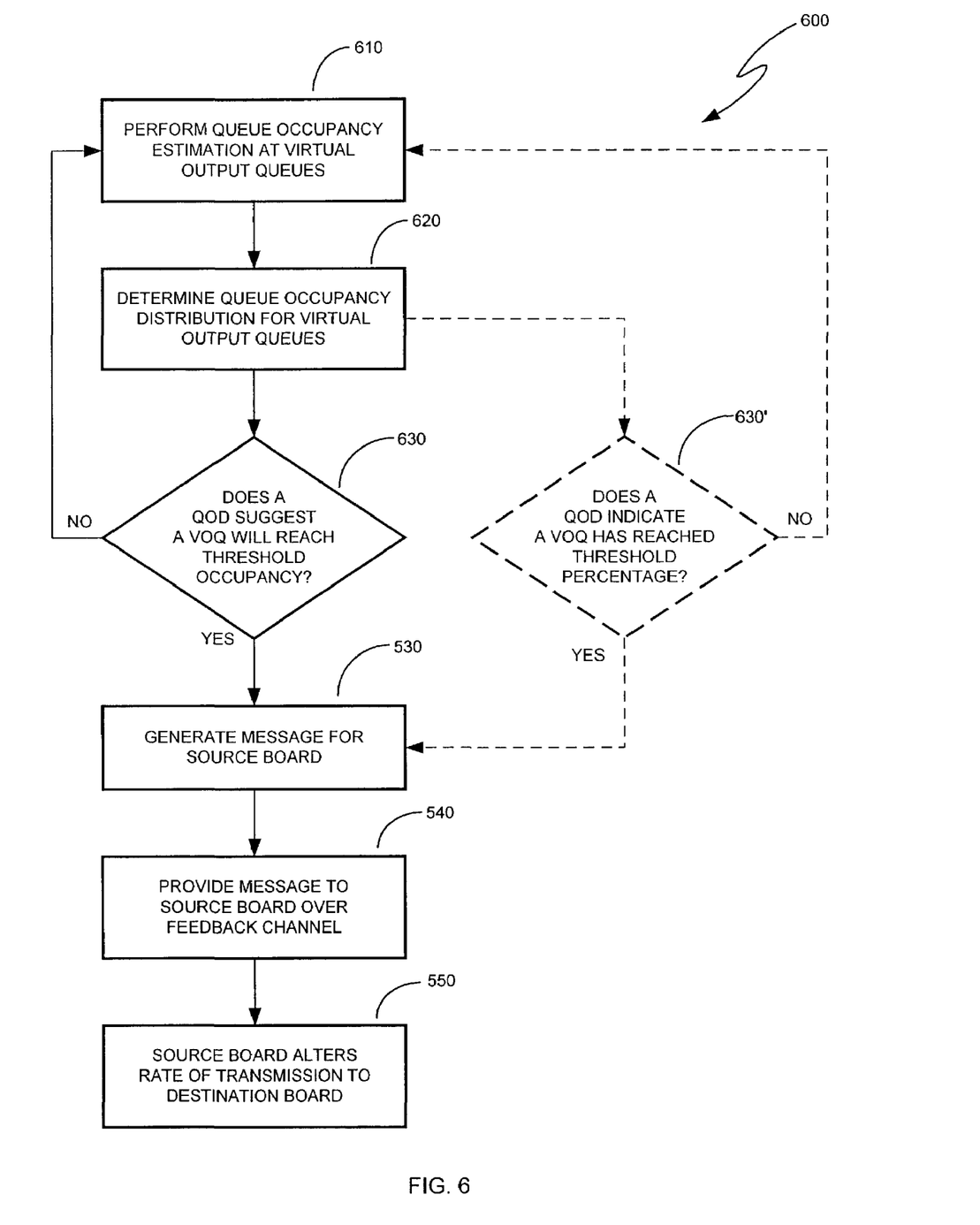
FIG. 6 is a block diagram illustrating embodiments of another method of providing virtual output queue feedback.

The above-described methods for virtual output queue feedback may be better understood by reference to FIGS. 5 and 6. Illustrated in FIG. 5 is an embodiment of a method 500 of providing virtual output queue feedback using threshold monitoring, whereas FIG. 6 illustrates embodiments of a method 600 of providing virtual output queue feedback using queue occupancy estimation, or QOE.

Referring now to FIG. 5, threshold monitoring is performed at each secondary virtual output queue 262 associated with each input port 252, as shown at block 510. More specifically, the number of packets (or packet addresses or bytes) stored in each of the secondary virtual output queues 262 is monitored to determine or detect if this number of packets (or addresses or bytes) reaches or exceeds the threshold occupancy. Referring to block 520, if a secondary virtual output queue 262 reaches the threshold occupancy, a message or signal is generated, as illustrated at block 530. The message may be generated (or accessed in a memory) by the feedback logic 290. The secondary virtual output queue 262 that reached the threshold level receives packets from a particular one of the boards 200a–n (i.e., the "source board"). Further, that secondary virtual output queue 262 is storing packets (or packet addresses or bytes) received from the source board that are addressed to a particular one of the other boards 200a–n (i.e., the "destination board"). Accordingly, the message will direct the source board to modify its rate of transmission for packets or other communications directed to the destination board. The source board may lower its rate of transmission to the destination board or interrupt transmission to the destination board. It should be noted that, although the source board may alter its rate of data transmission to a particular destination board in response to a message received from feedback logic 290, the source board may continue uninterrupted in its transmission of data to all other boards 200.

As shown at block 540, the message is provided to the source board 200 over the appropriate feedback channel 256. In response to the message, the source board lowers its rate of data transmission to, or interrupts data transmission to, the destination board, as illustrated at block 550. Thus, at the source board, the primary virtual output queue 212 associated with (i.e., transmitting to) the secondary virtual output queue 262 in switch 250 that has reached the threshold occupancy will experience a decrease in the egress rate of packets (or packet addresses or bytes) stored therein.

In another embodiment, where the primary virtual output queues 212 are allocated on a per quality of service level basis (see FIG. 4) and multiple primary virtual output queues 212 are associated with the secondary virtual output queue 262 that has achieved the threshold occupancy, all of the associated primary virtual output queues 212 may experience a decrease in the packet egress rate. Alternatively, some of the primary virtual output queues 212 (e.g., those storing lower priority communications) may experience a decrease in (or a complete interruption of) the packet egress rate, whereas other primary virtual output queues (e.g., those storing higher priority communications) may experience no change in the rate of packet egress, which may be desirable to prevent low priority traffic from clogging the secondary virtual output queues 262 in front of high priority traffic. Such a result is possible because the primary output queues 212 are virtual—as opposed to a more rigid data structure such as a FIFO type memory—and are stored in a configurable block of memory (that may be dynamic and configurable under control of a processor). Thus, the primary virtual output queues 212 may be partitioned according to quality of service levels, as well as per port, and the primary virtual output queues 212 may be managed via feedback control provided by feedback logic 290 and feedback channels 256a–n. The packets (or packet addresses or bytes) stored in the primary virtual output queues 212 (and/or secondary virtual output queues 262) may, therefore, be transmitted out of order.

A method 600 of providing virtual output queue feedback using QOE is illustrated in FIG. 6, as noted above. The method 600 shares some elements in common with the method 500 of FIG. 5, and like elements have retained the same numerical designation in FIG. 6.

Referring now to FIG. 6, queue occupancy estimation (QOE) is performed at the secondary virtual output queues 262, as shown at block 610. More specifically, the queue occupancy of each secondary virtual output queue 262 is periodically measured, and a queue occupancy distribution (QOD) is determined for each secondary virtual output queue 262—see block 620—and this QOD may be used to estimate the probability that a secondary virtual output queue 262 will exceed the threshold occupancy, as described above. Referring to block 630, if the QOD of a secondary virtual output queue 262 suggests this secondary virtual output queue will reach (or has reached) the threshold occupancy, a message or signal is generated, as illustrated at block 530.

As previously described, the message may be generated (or accessed in a memory) by the feedback logic 290. The secondary virtual output queue 262 that has reached (or is predicted to reach) the threshold occupancy receives packets from a particular one of the boards 200a–n (i.e., the "source board"). Further, that secondary virtual output queue 262 is storing packets (or packet addresses or bytes) received from the source board that are addressed to a particular one of the other boards 200a–n (i.e., the "destination board"). Accordingly, the message will direct the source board to modify its rate of transmission for packets or other communications directed to the destination board. The source board may lower its rate of transmission to the destination board or interrupt transmission to the destination board. It should be noted that, although the source board may alter its rate of data transmission to a particular destination board in response to a message received from feedback logic 290, the source board may continue uninterrupted in its transmission of data to all other boards 200.

As shown at block 540, the message is provided to the source board 200 over the appropriate feedback channel 256. In response to the message, the source board lowers its rate of data transmission to, or interrupts data transmission to, the destination board, as illustrated at block 550. Thus, at the source board, the primary virtual output queue 212 associated with (i.e., transmitting to) the secondary virtual output queue 262 in switch 250 that has reached (or is predicted to reach) the threshold occupancy will experience a decrease in the egress rate of packets (or packet addresses or bytes) stored therein.

In another embodiment, which is also illustrated in FIG. 6, rather than comparing the QOD against the threshold occupancy (see block 630), the QOD is compared against a threshold percentage. In this embodiment, the threshold is set in terms of a threshold percentage of time that the queue occupancy of a secondary virtual output queue 262 is at or above a specified occupancy, as noted above. Thus, referring to block 630', if the QOD indicates that a secondary virtual output queue 262 has reached the threshold percentage of time at the specified occupancy, the feedback logic 290 may provide a message to the source board 200 associated with that secondary virtual output queue to ease congestion (see blocks 530, 540, 550), as set forth above.

For the embodiments of FIG. 6, the primary virtual output queues 212 may be allocated on a per quality of service level basis (see FIG. 4), as previously described. Thus, multiple primary virtual output queues 212 may be associated with the secondary virtual output queue 262 that has reached (or is predicted to reach) the threshold occupancy or that has reached the threshold percentage, and the packets (or packet addresses or bytes) stored in the primary virtual output queues 212 may be transmitted out of order.

One of the virtual output queue feedback mechanisms described above with respect to FIGS. 5 and 6 will occur at all secondary virtual output queues 262 associated with every input port 252 of the switch 250. Thus, for any given destination (i.e., one board 200), all of the communications in route to that destination (i.e., those packets or addresses or bytes stored in the secondary virtual output queues 262 associated with the destination) are being monitored. If any one or more of these secondary virtual output queues 262 reaches the threshold occupancy (or threshold percentage), the rate of data transmission from its corresponding source board and to the destination board is altered to prevent the output buffer 282 and output port 254 associated with the destination board from becoming congested, as described above.

When the queue occupancy in a secondary virtual output queue 262 (that has reached or exceeded the threshold occupancy or threshold percentage) falls below the threshold level—or falls below some other set point less than the threshold level—regular communications between the source and destination boards may resume. It should be noted that out-of-order transmission of packets from the primary virtual output queues 212 (and/or secondary virtual output queues 262) may also occur during regular communications (i.e., when no throttling is occurring), such that high priority packets may be transmitted first.

Figure 7:
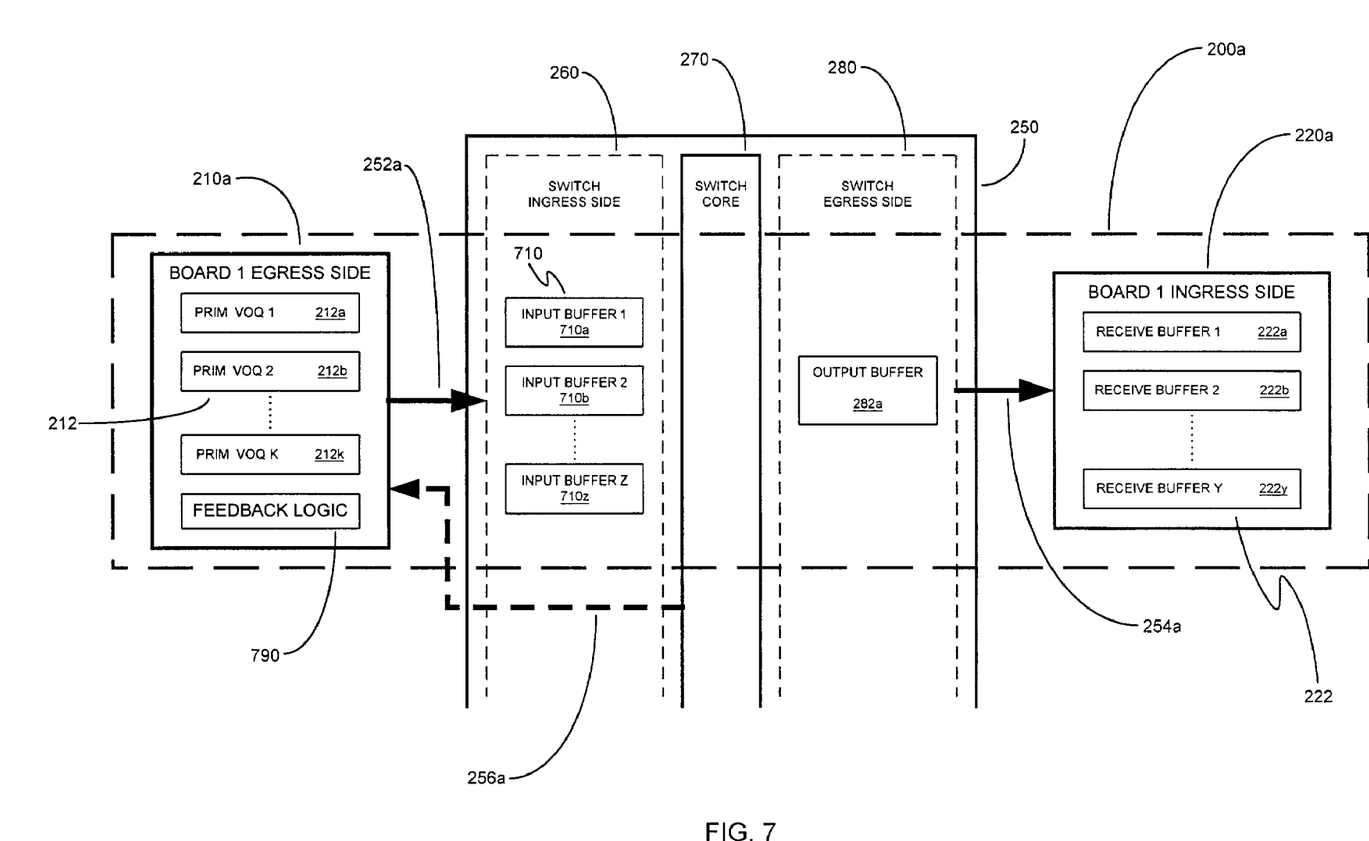
FIG. 7 is a schematic diagram illustrating a further embodiment of the switch and boards shown in FIG. 1.

Referring now to FIG. 7, a further embodiment of the switch 250 and boards 200a–n is illustrated. The embodiment shown in FIG. 7 is similar to the embodiments of the switch 250 and boards 200a–n described above with respect to FIGS. 1 through 4, and FIGS. 1 through 4 and their accompanying text are generally applicable to the embodiment of FIG. 7. However, in the embodiment of FIG. 7, the ingress side 260 of the switch 250 does not include the secondary virtual output queues 262 (see FIGS. 2 and 3). Rather, the ingress side 260 of switch 250 includes a number of input buffers 710 associated with each input port. For example, as shown in FIG. 7, the ingress side 260 includes input buffers 710a, 710b, . . . , 710z, these input buffers 710a–z being associated with the egress side 210a of board 200a (and with input port 252a). The input buffers 710 may be implemented in FIFO type memory buffers or other suitable memory. Generally, the number (Z) of input buffers 710a–z is equal to one less than the number of boards 200a–n or, stated alternatively, one less than the number of output ports 254a–n (i.e., Z=N−1).

The egress side of each board 200 also includes feedback logic. For example, the egress side 210a of board 200a include feedback logic 790. For the embodiment illustrated in FIG. 7, output queue feedback is performed only with respect to the primary virtual output queues 212 in the boards 200, and the feedback logic 790 includes the necessary control and/or logic circuitry to perform threshold monitoring and/or queue occupancy estimation, both as described above. If a primary virtual output queue 212 reaches (or is predicted to reach) the threshold occupancy (or the threshold percentage), the on-board feedback logic 790 may take direct action to slow or interrupt the rate of transmission from that primary virtual output queue 212, as described above with respect to FIGS. 5 and 6.

In the embodiment of FIG. 7, feedback logic 290 in switch 250 and feedback channels 256a–n are not required, as congestion control is performed at the board level. However, in yet another embodiment, feedback logic at the switch level as well as feedback channels (e.g., feedback channel 256a shown in dashed line) may be provided, such that virtual output queue feedback may be performed at either the primary virtual output queues 212 or at the secondary virtual output queues 262 (or both), as desired.

A feedback protocol has been proposed for both PCI Express and Infiniband to ease congestion in these switched backplane fabrics. In yet a further embodiment of the invention, the embodiment of FIG. 7 is adapted for use with the feedback protocols of PCI Express and Infiniband, respectively, such that threshold monitoring at the primary virtual output queues 212 of a board 200 triggers congestion control in response to congestion warning messages provided by the feedback protocol of PCI Express or Infiniband. This embodiment may find application where boards are coupled with and Infiniband or PCI Express switched fabric that does not implement virtual output queue feedback, as disclosed herein.

The respective feedback protocols of Infiniband and PCI Express monitor the output buffers at each output port of a switch and signals a congestion condition at any output port to the sources of congestion (e.g., the boards transmitting to the congested output port) or, optionally, to the board coupled with the congested output port (which, in turn, must signal congestion warnings to the source boards). In either case, the congestion warnings are sent through the switch to the source board or boards. Calibration of this feedback mechanism—i.e., setting the threshold for the output buffers and setting the number of congestion warning messages to be sent—is such that normal communication from the source board(s) to the switch is interrupted for a period of time that is a function of: (1) the number of congestion warning messages sent, and (2) the amount of time that normal communication is interrupted in response to each individual warning message.

To adapt virtual output queue feedback, as disclosed herein, to the feedback protocols of PCI Express and Infiniband, during the above-described calibration procedure, a board 200 performs queue occupancy estimation at the primary virtual output queues 212 (see FIG. 7) and monitors the arrival of congestion warning messages provided by the feedback protocol. The board 200 computes an estimate of the amount of time that normal communications are to be interrupted based upon the arrival of these congestion warning messages. The board 200 then sets a threshold percentage of time that the queue occupancy of the primary virtual output queues 212 is at or above a specified occupancy, such that, when a QOD indicates that the specified occupancy has been reached for the threshold percentage of time, this amount of time is the same as an amount of time that the congestion warning messages would cause normal communication to be interrupted. Thus, this embodiment utilizes the congestion warning messages provided by an Infiniband or PCI Express switched fabric during calibration to adapt virtual output queue feedback at the primary virtual output queues, as disclosed herein, to trigger congestion control. After the calibration procedure, the congestion control mechanism provided by Infiniband or PCI Express may be interrupted. Thus, this congestion control mechanism may be seldom used (e.g., during calibration) rather than continuously, thereby enabling the switching system to more fully utilize the backplane fabric for user traffic rather than for congestion control messages.

As described above, the logic and/or circuitry necessary to implement the methods 500, 600 of providing output queue feedback may be included in feedback logic 290 in switch 250 (or in feedback logic 790 in boards 200). However, it should be understood that the embodiments of the method for virtual output queue feedback disclosed herein may be implemented in either hardware or software, or any suitable combination thereof.

Embodiments of a system 10, including a switch 250 and a number of boards 200, that provide virtual output queue feedback—as well as embodiments of methods for providing virtual output queue feedback—having been herein described, those of ordinary skill in the art will appreciate the advantages thereof. Virtual output queue feedback provides the necessary congestion control to eliminate or minimize head-of-line blocking, thereby resulting in a more efficient utilization of available bandwidth and reducing the required speed-up factor at the links of a backplane fabric. The memory architecture—including a number of primary virtual output queues at each board and/or a number of secondary virtual output queues at the switch—allows for quality of service level allocation of memory and also for out-of-order transmission of packets. The true measure of the switch fabric congestion that needs to be minimized is congestion at the switch output buffers. Congestion at the secondary virtual output queues or at the primary virtual output queues is, in essence, a secondary effect caused by congestion at the output buffers of the switch. Applying threshold monitoring or queue occupancy estimation at the secondary or primary virtual output queues, as disclosed herein, alleviates congestion at the output buffers (and output ports) of the switch without the need to send congestion warning messages through the switch, as required by the feedback protocols of PCI Express and Infiniband.

The foregoing detailed description and accompanying drawings are only illustrative and not restrictive. They have been provided primarily for a clear and comprehensive understanding of the disclosed embodiments and no unnecessary limitations are to be understood therefrom. Numerous additions, deletions, and modifications to the embodiments described herein, as well as alternative arrangements, may be devised by those skilled in the art without departing from the spirit of the disclosed embodiments and the scope of the appended claims.

What is claimed is:

1. A method performed in a switch for controlling congestion, the switch disposed on a board coupled with a backplane, wherein at least a separate source board and a separate destination board are also coupled with the backplane, the method comprising:

determining a queue occupancy of a virtual queue associated with an input port of the switch and with an output port of the switch, the input port communicatively coupled with the source board and the output port communicatively coupled with the destination board, the source board providing data to the switch for transmission to the destination board; and sending a message from the switch to the source board if the queue occupancy of the virtual queue reaches a threshold occupancy, the message to direct the source board to alter a transmission rate to the destination board, wherein the threshold occupancy comprises a specified quantity of data, a specified number of packets, or a specified number of packet addresses;

wherein transmission rates from the source board to a number of other boards coupled with the backplane are unaltered by the message.

2. The method of claim 1, wherein the message directs the source board to lower the transmission rate to the destination board.

3. The method of claim 1, wherein the message directs the source board to interrupt transmission to the destination board.

4. A method performed in a switch for controlling congestion, the switch disposed on a board coupled with a backplane, wherein separate first, second, and third boards are also coupled with the backplane, the method comprising:

monitoring a number of virtual queues, each of the virtual queues corresponding to an input port of the switch and associated with an output port of the switch; and sending a message from the switch to the first board if one of the virtual queues reaches a threshold occupancy, the first board communicatively coupled with the input port corresponding to the one virtual queue, the first board providing data to the switch for transmission to the second board and the third board, wherein the message directs the first board to alter a rate of transmission to the second board, the second board communicatively coupled with the output port associated with the one virtual queue, wherein the threshold occupancy comprises a specified quantity of data, a specified number of packets, or a specified number of packet addresses;

wherein a transmission rate from the first board to the third board is unaltered by the message, the third board communicatively coupled with an output port associated with another of the virtual queues.

5. The method of claim 4, wherein the message directs the first board to lower the rate of transmission to the second board.

6. The method of claim 4, wherein the message directs the first board to stop transmission to the second board.

7. A method comprising:
determining a number of queue occupancy values for a virtual queue associated with an input port of a switch and with an output port of the switch, the input port coupled with a source board and the output port coupled with a destination board;
determining a queue occupancy distribution based upon the number of queue occupancy values; and
providing a message to the source board if the queue occupancy distribution indicates the virtual queue has reached a threshold occupancy, the message to direct the board to alter a transmission rate to the destination board;
wherein transmission rates from the source board to a number of other output ports of the switch are unaltered by the message.

8. The method of claim 7, wherein the number of queue occupancy values are determined by periodically measuring the queue occupancy of the virtual queue.

9. The method of claim 7, wherein the message directs the source board to lower the transmission rate to the destination board.

10. The method of claim 7, wherein the message directs the source board to stop transmission to the destination board.

11. A method comprising:
determining a number of queue occupancy values for a virtual queue associated with an input port of a switch and with an output port of the switch, the input port coupled with a source board and the output port coupled with a destination board;
determining a queue occupancy distribution based upon the number of queue occupancy values; and
providing a message to the source board if the queue occupancy distribution indicates the virtual queue has reached a specified occupancy for a threshold percentage of time, the message to direct the source board to alter a transmission rate to the destination board;
wherein transmission rates from the source board to a number of other output ports of the switch are unaltered by the message.

12. The method of claim 11, wherein the number of queue occupancy values are determined by periodically measuring the queue occupancy of the virtual queue.

13. The method of claim 11, wherein the message directs the source board to lower the transmission rate to the destination board.

14. The method of claim 11, wherein the message directs the source board to stop transmission to the destination board.

15. A switch comprising:
a board, the board to couple with a backplane, wherein at least a separate source board and a separate destination board are coupled with the backplane;
an input port disposed on the board, the input port to communicatively couple with the source board, the source board providing data to the switch for transmission to the destination board;
a number of output ports disposed on the board, each of the output ports coupled with the input port;
a number of virtual queues disposed on the board and coupled with the input port, one of the virtual queues associated with one of the output ports, the one output port to communicatively couple with the destination board;
a feedback channel, the feedback channel to communicatively couple with the source board; and
feedback logic disposed on the board and coupled with the feedback channel and the number of virtual queues, the feedback logic to transmit a message over the feedback channel to the source board in response to the one virtual queue reaching a threshold occupancy, the message to direct the source board to alter a transmission rate to the destination board, wherein the threshold occupancy comprises a specified quantity of data, a specified number of packets, or a specified number of packet addresses;
wherein a transmission rate from the source board to at least one other board coupled with the backplane is unaltered by the message.

16. The switch of claim 15, wherein the number of virtual queues is one less than the number of output ports.

17. The switch of claim 15, wherein each of the virtual queues is associated with a priority level.

18. The switch of claim 15, wherein the message directs the source board to interrupt transmission to the destination board.

19. The switch of claim 15, wherein the message directs the source board to lower the transmission rate to the destination board.

20. A system comprising:
a backplane;
a number of boards coupled with the backplane, the number of boards including a first board providing data for transmission to a second of the boards; and
a switch coupled with the backplane, the switch including
an input port communicatively coupled with the first board,
a number of output ports, each of the output ports coupled with the input port, one of the output ports communicatively coupled with the second board,
a number of virtual queues coupled with the input port, one of the virtual queues associated with the one output port coupled with the second board,
a feedback channel communicatively coupled with the first board, and
feedback logic coupled with the feedback channel and the number of virtual queues, the feedback logic to transmit a message over the feedback channel to the first board in response to the one virtual queue reaching a threshold occupancy, the message to direct the first board to alter a transmission rate to the second board, wherein the threshold occupancy comprises a specified quantity of data, a specified number of packets, or a specified number of packet addresses,
wherein a transmission rate from the first board to at least one other of the number of boards is unaltered by the message.

21. The system of claim 20, wherein the number of virtual queues equals one less than the number of output ports.

22. The system of claim 20, wherein each of the virtual queues is associated with a priority level.

23. The system of claim 20, wherein the message directs the first board to lower the transmission rate to the second board.

24. The system of claim 20, wherein the message directs the first board to interrupt transmission to the second board.

25. A method comprising:
determining a number of queue occupancy values for a virtual queue associated with an input port of a switch;
determining a queue occupancy distribution based upon the number of queue occupancy values;
receiving a number of congestion warning messages from the switch;
determining a time period based upon the number of congestion warning messages; and
altering a rate of transmission from the virtual queue if the queue occupancy distribution indicates the queue occupancy of the virtual queue has reached a specified occupancy for a threshold percentage of time, the threshold percentage of time corresponding to the time period.

26. The method of claim 25, wherein the switch is operating in accordance with PCI Express.

27. The method of claim 25, wherein the switch is operating in accordance with Infiniband.

28. The method of claim 25, wherein the number of queue occupancy values are determined by periodically measuring the queue occupancy of the virtual queue.

29. An article of manufacture comprising:
a medium having content that, when accessed by a switch, causes the switch to perform a method for controlling congestion, the switch disposed on a board coupled with a backplane, wherein at least a separate source board and a separate destination board are also coupled with the backplane, the method comprising
determining a queue occupancy of a virtual queue associated with an input port of the switch and with an output port of the switch, the input port communicatively coupled with the source board and the output port communicatively coupled with the destination board, the source board providing data to the switch for transmission to the destination board; and
sending a message from the switch to the source board if the queue occupancy of the virtual queue reaches a threshold occupancy, the message to direct the source board to alter a transmission rate to the destination board, wherein the threshold occupancy comprises a specified quantity of data, a specified number of packets, or a specified number of packet addresses;
wherein transmission rates from the source board to a number of other boards coupled with the backplane are unaltered by the message.

30. The article of manufacture of claim 29, wherein the message directs the source board to lower the transmission rate to the destination board.

31. The article of manufacture of claim 29, wherein the message directs the source board to interrupt transmission to the destination board.

32. An apparatus comprising:
an input port, the input port to couple with a source board;
a number of output ports, each of the output ports coupled with the input port;
a number of virtual queues associated with the input port;
a feedback channel, the feedback channel to couple with the source board; and
feedback logic, the feedback logic to
determine a number of queue occupancy values for one of the virtual queues, the one virtual queue associated with one of the output ports, the one output port to couple with a destination board,
determine a queue occupancy distribution based upon the number of queue occupancy values, and
transmit a message over the feedback channel to the source board if the queue occupancy distribution indicates the one virtual queue has reached a threshold occupancy, the message to direct the source board to alter a transmission rate to the destination board,
wherein transmission rates from the source board to the other output ports are unaltered by the message.

33. The apparatus of claim 32, the number of queue occupancy values are determined by periodically measuring the queue occupancy of the one virtual queue.

34. The apparatus of claim 32, wherein the message directs the source board to interrupt transmission to the destination board.

35. The apparatus of claim 32, wherein the message directs the source board to lower the transmission rate to the destination board.

36. An apparatus comprising:
an input port, the input port to couple with a source board;
a number of output ports, each of the output ports coupled with the input port;
a number of virtual queues associated with the input port;
a feedback channel, the feedback channel to couple with the source board; and
feedback logic, the feedback logic to
determine a number of queue occupancy values for one of the virtual queues, the one virtual queue associated with one of the output ports, the one output port to couple with a destination board,
determine a queue occupancy distribution based upon the number of queue occupancy values, and
transmit a message over the feedback channel to the source board if the queue occupancy distribution indicates the one virtual queue has reached a specified occupancy for a threshold percentage of time, the message to direct the source board to alter a transmission rate to the destination board,
wherein transmission rates from the source board to the other output ports are unaltered by the message.

37. The apparatus of claim 36, wherein the number of queue occupancy values are determined by periodically measuring the queue occupancy of the one virtual queue.

38. The apparatus of claim 36, wherein the message directs the source board to interrupt transmission to the destination board.

39. The apparatus of claim 36, wherein the message directs the source board to lower the transmission rate to the destination board.

* * * * *